Sept. 26, 1967  T. E. HOWARD  3,343,655
UNDULATORY CONVEYOR

Filed Dec. 12, 1966  4 Sheets-Sheet 2

INVENTOR
THOMAS E. HOWARD
BY Ernest S. Cohen
ATTORNEY

Sept. 26, 1967 T. E. HOWARD 3,343,655
UNDULATORY CONVEYOR
Filed Dec. 12, 1966 4 Sheets-Sheet 3

INVENTOR
THOMAS E. HOWARD
BY Ernest L. Cohen
ATTORNEY

United States Patent Office 3,343,655
Patented Sept. 26, 1967

3,343,655
UNDULATORY CONVEYOR
Thomas E. Howard, Bethesda, Md., assignor to the United States of America as represented by the Secretary of the Interior
Filed Dec. 12, 1966, Ser. No. 601,225
10 Claims. (Cl. 198—218)

ABSTRACT OF THE DISCLOSURE

A conveyor wherein material is caused to move along a flexible belt as the belt is given a wave-like undulatory movement by the sequenced activation of vertically movable supports which are operable to raise and lower the belt at predetermined positions along its length in a timed relationship.

Background of invention

In present-day underground mining and tunneling operations, the transportation of broken ore, coal or rock is one of the most costly elements of the mining process.

Non-continuous transport systems such as trucks, shuttle cars, scrapers, or rail haulage are complex and expensive. Continuous conveyors presently used in underground mining and tunneling operations are generally of three types; standard belt conveyors, chain conveyors and shaker conveyors. In the first two types material is moved on or by an endless belt or chain running over a drive pulley at one end of the conveyor and an idler tail pulley at the other. The length of these conveyors can be extended only by shutting down, and adding a length of belt or chain, with appropriate supporting apparatus, somewhere between the head and tail sections. Furthermore, ordinary belt conveyors must be kept aligned and corners can be negotiated only by transfer from one belt to another, each of which must be separately powered. Some chain conveyors can negotiate curves, but, in all chain conveyors the traveling chains and crosspieces must slide in and on guides and excessive wear becomes a problem, particularly when conveying abrasive materials such as metal ores.

In shaker conveyors flat steel troughs are connected together in series and caused to vibrate with an oscillatory motion so that the material in the trough is made to slide toward one end. Though this type of conveyor is modular in nature it is essentially limited to material having good frictional and low abrasive properties. Furthermore, though alignment is not critical shaker conveyors will not traverse a curve.

Thus, there is obviously a need in the art of conveyors for a device that is modular in nature so that it can be quickly extended in length, that can be powered at any one or a number of places along its length, that can be constructed in curved modules to traverse corners and that is not subject to malfunction due to slight misalignment.

Flexible belts have previously been used to convey materials. For example, U.S. Patent 1,958,322 to Symington uses a flexible belt fixed to immovable points at both ends and at various points intermediate and utilizes rotating rollers to communicate with the lower surfaces of the belt between two immovable points as they driven through an arc. Successive rollers are provided in a timed relationship and together they impart to the flexible belt a plurality of crests which rise forward and upward and fall forward and downward as the driving members describe their circular paths. This apparatus while in some ways similar to the apparatus of the present invention, does not provide some major advantages of the present apparatus, namely, the ability to traverse corners, the ability to operate under minor misalignment and the ability to attach extra lengths in operation.

Objects of invention

Accordingly, the objects of this invention are to provide:

An improved conveying apparatus;
An apparatus for the conveyance of solid materials which is modular in nature and can quickly be extended in length;
A conveyor that will negotiate curves;
A conveyor that can be powered at plurality of points along its length;
A conveyor that is not subject to malfunction because of slight misalignment; and
An apparatus for conveniently and efficiently conveying solid materials from the face of a tunnel or mine heading which is continuous in operation, modular in nature and can negotiate corners.

Still other objects and advantages of this invention will become apparent from the following description in which reference is made to the accompanying drawings.

Brief summary of invention

Briefly, the present invention is directed to a novel conveying apparatus comprising a flexible belt secured at a plurality of points to movable supports which are caused by a powered drive means to successively rise and fall thereby causing short transverse sections of the belt to change rapidly from a loose loop or horizontal trough to a taut inclined plane.

The successive rising and falling of adjacent movable supports causes the motion of the flexible belt to take on the appearance of a wave, but in fact, the crests do not move in a horizontal direction.

Detailed description of invention

Figure 1:
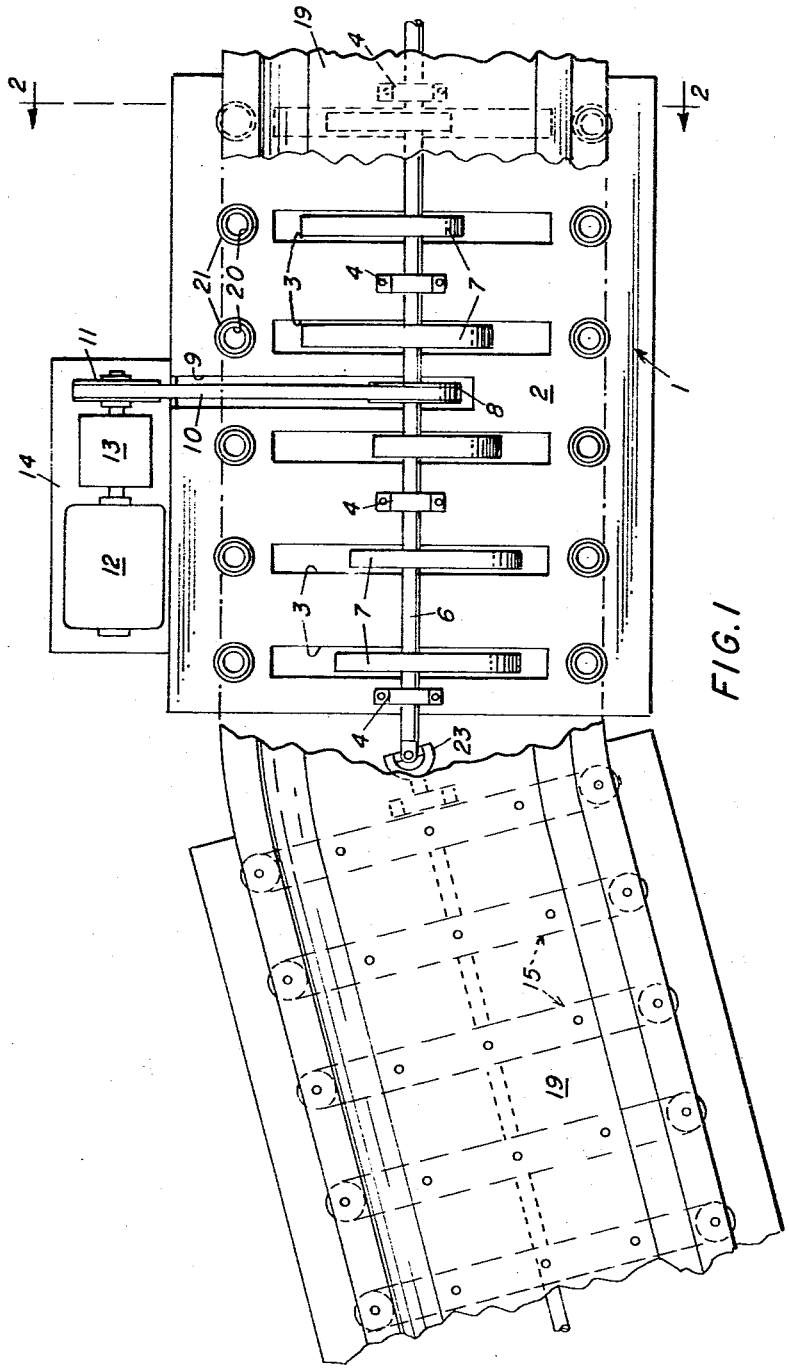
FIG. 1 is a plan view partially cut-away showing two modules of a conveyor according to the present invention attached so as to be nonlinearly aligned.
Figure 3:
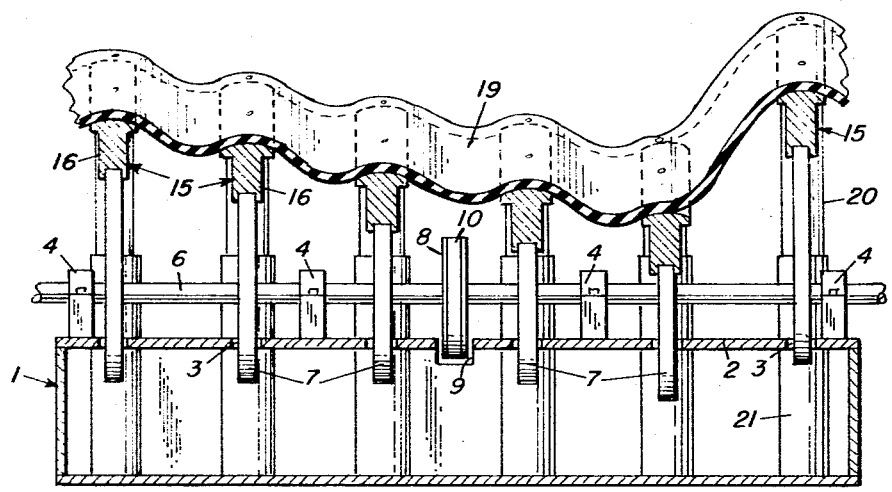
FIG. 3 is an elevational view partly in cross-section taken along 3—3 of FIG. 2.

Referring now to FIG. 3, there is shown a cross-section of a module of the present apparatus. In that figure, 1 represents a base portion which consists primarily of a box frame support. The upper surface 2 of this support has provided therein, regularly spaced slots 3 as shown in FIG. 1. Centrally located and linearly aligned on the top of surface 2 are bearing housings 4 which are firmly attached to surface 2 of base portion 1. These bearing housings have mounted within a conventional bearing means. Running through these bearings is a drive shaft 6, which serves as a rotating axis, cams 7 are mounted at regularly spaced intervals along shaft 6 such that they extend through slots 3. Also attached to shaft 6 is a drive pulley 8 which is positioned directly above and extends partially into slot 9 in upper surface 2 of base portion 1, as shown in FIG. 1. A belt 10 communicates between drive pulley 8 and pulley 11. Pulley 11 is driven by a powered unit which comprises motor 12 and transmission 13. The power unit is secured to a mount 14 which is attached to base portion 1.

Figure 2:
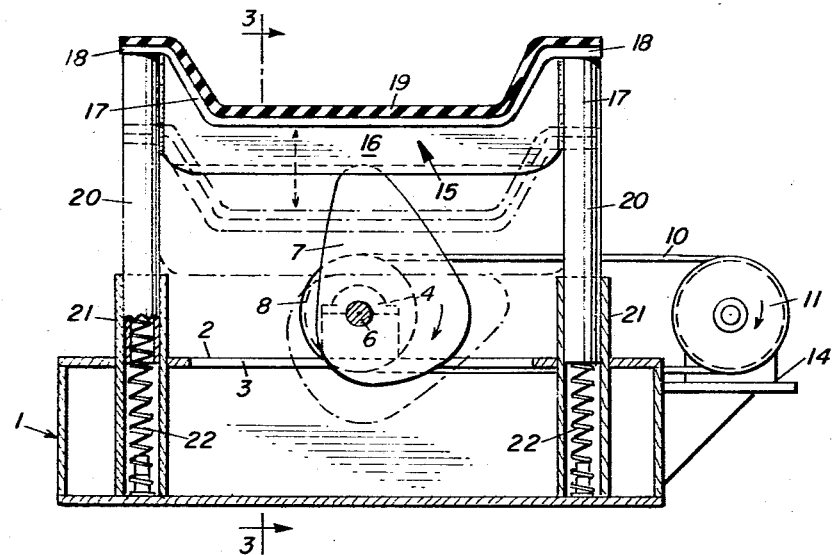
FIG. 2 is an elevational view partly in cross-section taken along 2—2 of FIG. 1.

Referring now to FIG. 2 and FIG. 3, yokes 15 are shown as riding on cams 7. These yokes as shown in FIG. 2, comprises a trough portion 16, inclined wall portions 17 and shoulders 18. Attached to the upper surface of these yokes is a flexible belt 19. Shoulder portions 18 of yokes 15 are secured to hollow tubes 20. These hollow tubes are slidably mounted within a second pair of hollow tubes 21 which are attached to base portion 1. Tension springs 22 extend the entire length through these hollow tubes as shown in FIG. 2 and are attached at their ends by any conventional means to base portion 1 and shoulders 18.

In the operation of a single module, the power unit operates through pulley 11 and belt 10 to turn drive wheel 8 causing the drive shaft 6 with attached cams 7 to rotate. The cams are designed so that in successive order, yokes 15 are caused to rise very quickly to a maximum height while the next yoke is at its minimum. This rapid upward movement of the yoke causes any material such as ore, coal or the like, present in the trough of belt 19 between that yoke and the next yoke to be propelled into the next trough by combined actions of a force exerted on the material due to the rapid tightening of the belt and the force of gravity. As soon as the material has been propelled to the next trough the second yoke rapidly rises and the action is repeated. Meanwhile, springs 22 maintain yokes 15 tightly against cams 7 and prevent "floating" of the yokes and belt. The result being that material present on the flexible belt is conveyed from one end of the module to the other.

Figure 7:
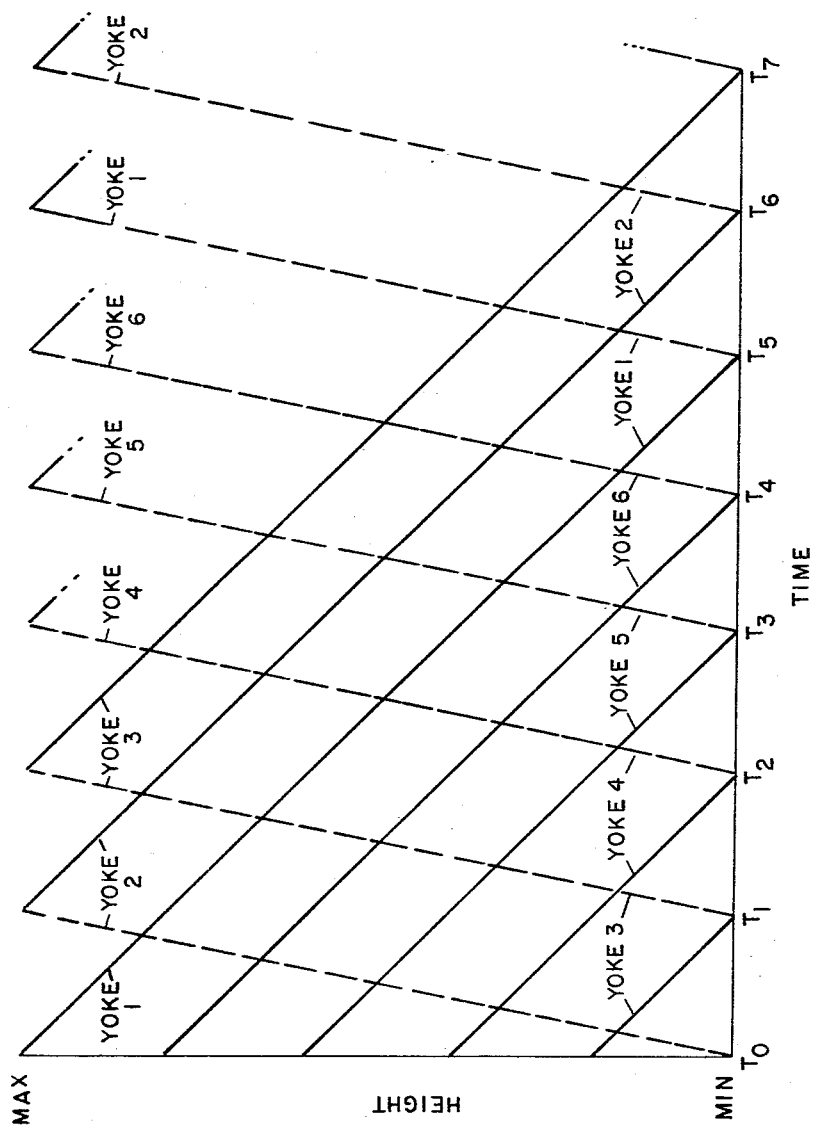
FIG. 7 is a graph illustrating the movement of the present conveyor by showing the height of the yokes as a function of time.

The motion of the successive yokes will be more fully understood when reference is made to FIG. 7. That figure graphically illustrates the position (height) of each yoke in a six yoke module such as the one shown in FIG. 1, as a function of time. At $T_0$, yoke $Y_1$ is at maximum height while the second yoke $Y_2$ is at its minimum. This is the position shown in FIG. 1. At this position, material which had been present between yokes $Y_1$ and $Y_2$ is propelled to the space between yokes $Y_2$ and $Y_3$. At the next time interval $T_1$ yoke $Y_2$ is at its maximum and yoke $Y_3$ is at its minimum and the material present between these two yokes is propelled to a position between yokes $Y_3$ and $Y_4$. At the next time interval $Y_3$ reaches its maximum and $Y_4$ its minimum. At time interval $T_6$, the cycle has completed itself and yoke $Y_1$ is again at its maximum.

It should be realized that FIG. 7 is merely illustrative of the type of movement generated in an apparatus according to the present invention. In practice, such a sharp change in motion as is shown at the minimum and maximum locations in FIG. 7 would probably not occur especially if a cammed system were used to drive the yokes. Also, it is not a requirement of this invention that the cycle be completed with 6 yokes. More or less may be used dependent upon the requirements of each system. It is preferable however that the cycle be formed by not less than three yokes.

It can now be appreciated that the motion generated by the apparatus of this invention is very different from the motion generated in an apparatus of the type described by Symington in U.S. Patent 1,958,322. The motion of that device is sinusoidal with the crest of the wave having a component of motion in the horizontal direction. In my apparatus, the crests of the flexible belt are caused to move only in a vertical direction.

One advantage to the present invention is that the conveyor is modular in nature. A plurality of modules may form any length conveyor desired. Furthermore, as illustrated in FIG. 1, if a coupling such as universal joint 23 is used to connect the drive shafts of successive modules, a moderate amount of misalignment will not effect the operation of the units. This coupling may be either a universal, a fluid coupling, a flexible shaft, etc., and may include a clutching means.

Furthermore, each unit may be separately powered or, one powered module may supply power to operate a plurality of units.

Figure 4:
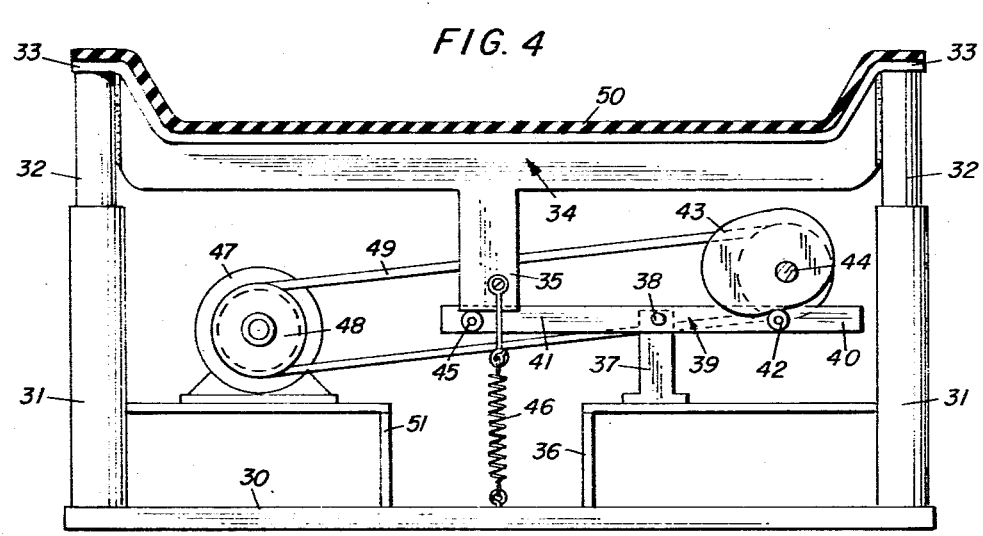
FIG. 4 is an elevational view partly in cross-section showing an alternative driving arrangement.

The type of power source and the particular means of raising and lowering the yokes in a timed relationship is not critical. Power sources may be mechanical, electrical, or hydraulic, and driving means may be by various mechanical gearing arrangements, hydraulic pistons or bags, or electrically through suitably mounted solenoids. A preferred mechanical drive arrangement is shown in FIG. 4. That figure shows an end view of a module having a base portion 30. Attached to each side of base portion 30 is a hollow tube 31 in which there is slidably mounted a second inner tube 32, such as previously described in FIG. 2. To the uppermost end of this inner tube 32 is attached the shoulder portions 33 of a yoke 34 such as previously described in FIG. 2. Attached to the upper surface of yoke 34 is a flexible belt 50, while yoke 34 has positioned on its underside a downwardly projecting portion 35. Also attached to base portion 30 is a frame support 36 to which there is mounted a lever support 37 having a pin 38 extending horizontally from its upper end. This pin forms an axis for a lever arm 39 which comprises a small end 40 and an elongated end 41. Mounted on the small end 40 is a cam follower pin 42. In communication with pin 42 is a driving cam 43 mounted on a drive shaft 44. Positioned on elongated end 41 is a roller pin 45 which is in communication with downwardly projecting portion 35 of yoke 34. A spring means 46 is also provided between base portion 30 and portion 35.

A motor 47 having a pulley 48 and belt 49 is mounted on support 51 and drives shaft 44 by way of a driving pulley (not shown) substantially in the manner that shaft 6 of FIG. 1 is powered. In operation yoke 34 is caused to move up and down when motor 47 drives belt 49 causing shaft 44 and cam 43 to rotate. This rotation actuates end 40 of lever arm 39 causing elongated end 41 to move up and down. This type of driving arrangement is particularly advantageous when it is desirable to provide on a single module, yokes which are not all parallel to each other. The single point of contact at roller 45 with extended portion 35 allows yokes 34 to assume angles other than 90° with respect to driving shaft 44. Thus, with a minimum amount of flexible couplings in shaft 44 a curved module may be constructed.

Figure 5:
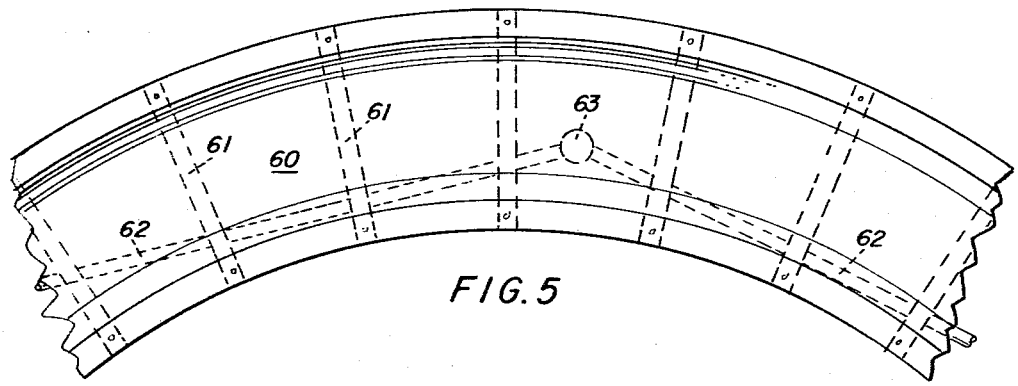
FIG. 5 is a schematic drawing illustrating a curved module.

FIG. 5 is a plan view schematically illustrating such a curved module. In that figure, 60 is a flexible belt which is attached to and supported by a plurality of yokes 61. By varying the length of the lever arms and the shape of the cams in a driving arrangement of the type shown in FIG. 4, it is possible to drive a curved module with a drive shaft 62 having only one flexible joint 63.

Electric and hydraulic driving means which do not require a drive shaft are also useful for powering curved modules.

Figure 6:
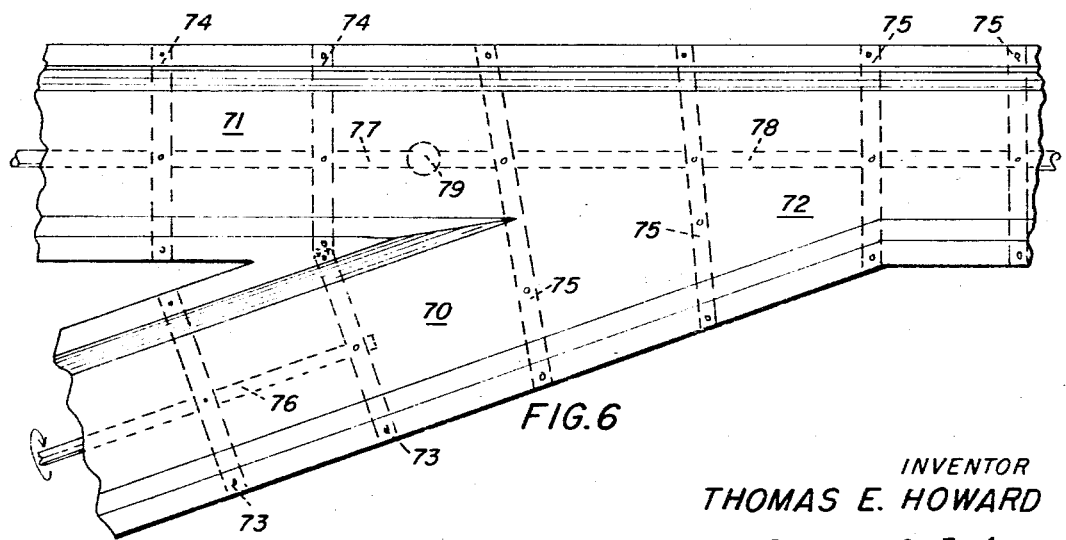
FIG. 6 is a schematic drawing illustrating a "switching" module.

Still another type of module is shown in FIG. 6. This type of unit is most aptly described as "switching" module. The unit is constructed in a Y shape. The unit has 3 portions of flexible belt, shown as leg portions 70 and 71 and body portion 72. These may be parts of one belt or separate belts. Portions 70, 71 and 72 are activated by yokes 73, 74 and 75 respectively. Each of these sets of yokes is powered by a separate drive train of the type shown in FIG. 2. In the drawing, yokes 73 are shown powered by drive 76, yokes 74 by drive 77, and yokes 75 by drive 78. One of the "leg" drives may be attached to the "body" drive by means of a coupling. For example, FIG. 6 shows drive 77 attached to drive 78 by a coupling 79 which may include a clutching means well known in the art.

In operation, material may be conveyed either simultaneously or individually from belt portions 70 and 71 to belt portion 72. If it is desired to simultaneously convey material from the leg portions to the body portion yokes 73 and 74 must be actuated by driving means 76 and 77 respectively, so that they operate in a timed relationship to yokes 75 which are being actuated by driving means 78.

To feed material from a single leg, the driving means to the other leg is turned off and where the drive of the leg is coupled with the drive of the body portion as is the case with drives 77 and 78 in FIG. 6, the drive of the leg must be uncoupled. This may easily be accomplished by using a clutch in the case of a mechanical drive and opening the circuit by means of a switch in the case of an electrical drive. Material may also be conveyed from the body portion simultaneously to two leg portions. Thus a main stream may be split by the operation of "switching" units into a plurality of smaller streams.

There has now been described a novel type of continuous conveyor having the unique ability to be installed in modules, to traverse corners, to operate in spite of slight angular misalignment, to be installed in "switching" units which can be powered at various points along its length by a number of types of driving means, and which can be extended in length while in operation.

Obviously, this new type of conveyor is subject to a great number of modifications. Units may be operated over a wide range of speeds, height of undulations, and yoke spacings. The flexible belt may be constructed from rubber, plastic, cloth or any other flexible material which possesses the necessary toughness. Various sorts of couplings may be used to connect modules depending on the type of drive which as previously mentioned, may be mechanical, hydraulic or electrical.

Still further modifications, adaptations and alterations, which will become apparent to those of ordinary skill in the art, are possible within the spirit and scope of this invention.

What is claimed is:

1. A conveying apparatus for conveying solid materials comprising; a flexible belt, a plurality of belt supporting means transverse to the longitudinal axis of said belt spaced at predetermined distances along said belt, means to attach said flexible belt to each of said supporting means and means to raise and lower said supporting means in substantially vertical plane in a timed relationship whereby there is imparted to said belt an undulatory movement having a wave-like appearance.

2. The apparatus of claim 1 wherein said belt supporting means extend the width of said belt.

3. The apparatus of claim 1 wherein said flexible belt includes a trough portion disposed between side-wall portions.

4. The apparatus of claim 1 wherein the flexible belt traverses a curved path along a generally horizontal plane.

5. The apparatus of claim 1 wherein the flexible belt comprises a plurality of converging leg portions integral with a body portion and wherein each of said leg portions and said body portion are provided with a support means and a means to raise and lower said support means in a substantially vertical plane and wherein said means to raise and lower are conjoined in a timed relationship whereby material from said leg portions is conveyed to said body portion.

6. The apparatus of claim 5 wherein each of said means to raise and lower may be independently operated.

7. The apparatus of claim 5 wherein said means to raise and lower are conjoined in a timed relationship whereby material from said body portion is conveyed to said leg portions.

8. The apparatus of claim 1 wherein said conveying apparatus comprises a plurality of serially connected modules each of said modules having at least three said supporting means.

9. The apparatus of claim 8 wherein said modules are connected by a flexible coupling.

10. The apparatus of claim 9 wherein said means to raise and lower comprises a cammed drive shaft and said flexible coupling comprises a universal joint and wherein a clutching means is also positioned between said modules.

References Cited

UNITED STATES PATENTS

| | | | |
|---|---|---|---|
| 1,958,322 | 5/1934 | Symington | 198—1 |
| 3,297,125 | 12/1967 | Pool | 198—1 |

RICHARD E. AEGERTER, *Primary Examiner.*